US005834080A

United States Patent [19]

Mort et al.

[11] Patent Number: 5,834,080

[45] Date of Patent: Nov. 10, 1998

[54] CONTROLLABLY CONDUCTIVE POLYMER COMPOSITIONS FOR DEVELOPMENT SYSTEMS

[75] Inventors: Joseph Mort; Bing R. Hsieh; Mary A. Machonkin, all of Webster; Joseph Mammino, Penfield; John F. Yanus, Webster, all of N.Y.

[73] Assignee: Xerox Corporation, Stamford, Calif.

[21] Appl. No.: 323,695

[22] Filed: Oct. 18, 1994

[51] Int. Cl.$^6$ .............................. B29D 22/00; B32B 1/08

[52] U.S. Cl. .................. 428/36.91; 252/500; 252/518.1; 252/519.14; 428/409; 428/906; 430/58; 430/59; 524/83; 524/87; 524/96; 524/236; 524/251; 524/255; 524/256; 524/258; 524/500; 524/502; 524/505; 524/530; 524/570

[58] Field of Search .................................... 524/502, 500, 524/236, 505, 530, 570, 83, 87, 96, 251, 255, 256, 258; 428/36.91, 409, 906; 430/58, 59; 252/500, 518, 519.14

[56] References Cited

U.S. PATENT DOCUMENTS

| | | | |
|---|---|---|---|
| 3,590,000 | 6/1971 | Palermiti et al. | 252/62.1 |
| 4,078,929 | 3/1978 | Gundlach | 96/1.2 |
| 4,264,697 | 4/1981 | Perez et al. | 430/107 |
| 4,265,990 | 5/1981 | Stolka et al. | 430/59 |
| 4,298,672 | 11/1981 | Lu | 430/108 |
| 4,338,222 | 7/1982 | Limburg et al. | 252/500 |
| 4,338,390 | 7/1982 | Lu | 430/106 |
| 4,459,009 | 7/1984 | Hays et al. | 430/120 |
| 4,505,573 | 3/1985 | Brewington et al. | 430/120 |
| 4,565,437 | 1/1986 | Lubinsky | 430/122 |
| 4,806,443 | 2/1989 | Yanus et al. | 430/56 |
| 4,809,034 | 2/1989 | Murasaki et al. | 355/300 |
| 4,876,575 | 10/1989 | Hays | 355/259 |
| 4,883,736 | 11/1989 | Hoffend et al. | 430/110 |
| 4,904,762 | 2/1990 | Chang et al. | 430/110 |
| 4,935,326 | 6/1990 | Creatura et al. | 430/108 |
| 4,937,166 | 6/1990 | Creatura et al. | 430/108 |
| 4,988,595 | 1/1991 | Pai et al. | 430/59 |
| 5,032,872 | 7/1991 | Folkins et al. | 355/259 |
| 5,034,775 | 7/1991 | Folkins | 355/259 |
| 5,300,339 | 4/1994 | Hays et al. | 428/36.9 |
| 5,386,277 | 1/1995 | Hays et al. | 355/259 |

OTHER PUBLICATIONS

Hofmann, W., *Rubber Technology Handbook* (1988), pp. 39–40.

Lupinski et al., *J. Polymer Science* C 16:1561 (1967).

Mori et al., *J. Electronic Materials* 9:411 (1980).

*Primary Examiner*—Jody M. Reddick
*Attorney, Agent, or Firm*—Oliff & Berridge, PLC

[57] ABSTRACT

Controllably conductive polymer compositions may be used in electrophotographic imaging developing systems, such as scavengeless or hybrid scavengeless systems or liquid image development systems. The conductive polymer compositions includes a charge-transporting material (particularly a charge-transporting, thiophene-containing polymer or an inert elastomeric polymer, such as a butadiene- or isoprene-based copolymer or an aromatic polyether-based polyurethane elastomer, that additionally comprises charge transport molecules) and a dopant capable of accepting electrons from the charge-transporting material. The invention also relates to an electrophotographic printing machine, a developing apparatus, and a coated transport member, an intermediate transfer belt, and a hybrid compliant photoreceptor comprising a composition of the invention.

29 Claims, 4 Drawing Sheets

CONTROLLABLY CONDUCTIVE POLYMER COMPOSITIONS FOR DEVELOPMENT SYSTEMS

BACKGROUND OF THE INVENTION

The invention relates to polymeric compositions having controllable, reproducible and stable electrical conductivities of about $10^{-9}$ to $10^{-10}$S or (ohm-cm)$^{-1}$. Such compositions may be used in electrophotographic image development systems such as liquid image development systems or scavengeless and hybrid scavengeless development systems. The scavengeless development systems do not scavenge or interact with a previously toned image (so as to affect image quality) and are important in trilevel and highlight color xerography (e.g. U.S. Pat. No. 4,078,929).

Two-phase conductive compositions have contained dispersions of conductive particles (e.g., carbon black or graphite) in insulating polymer matrices (e.g., dielectric binders such as a phenolic resin or fluoropolymer) close to the percolation threshold concentration. Such concentration levels allow conductive particle contact, resulting in a burst of conductivity. (See e.g., Brewington et al., U.S. Pat. No. 4,505,573.) The dielectric constant of these overcoatings ranges from about 3 to about 5, and preferably is about 3. The desired conductivity (measured in "(ohm-cm)$^{-1}$" or "S") is achieved by controlling the loading of the conductive particles. However, the low conductivity values required for electrophotographic image development systems and the large, intrinsic electrical conductivity of carbon black make it extremely difficult to achieve predictable and reproducible conductivity values. Very small changes in the loading of conductive particles near the percolation threshold can cause dramatic changes in the coating's conductivity. Furthermore, differences in particle size and shape can cause wide variations in conductivity at even a constant weight loading. Moreover, the percolation threshold approach requires relatively high conductive particle concentrations. At these concentrations, the coating becomes brittle, its mechanical properties becoming controlled by carbon black rather than the polymer matrix.

Another approach is to molecularly dope an inert polymer matrix with mixtures of a neutral transport molecule and its radical cation or anion. "Molecular doping" refers to the relatively low amounts of dopant added (as compared to carbon black dispersions) to increase the polymer matrix's conductivity, and to the fact that the resulting mixture is essentially a solid solution. No chemical bonding occurs between the dopant and the charge-transporting polymer so as to produce a new material or alloy. That is, the charge-transporting polymer is rendered highly and stably conductive by molecular doping with dopants such as oxidizing agents. In the presence of an oxidizing dopant, the partially oxidized charge-transporting moieties in the charge-transporting polymer act as hole carrier sites, which transport positive charges or "holes" through the unoxidized charge-transporting moieties.

For example, Mort et al., *J. Electronic Materials* 9:41 (1980), discloses the possibility of chemically controlling dark conductivity by co-doping a polycarbonate with neutral and oxidized species of the same molecule, tri-p-tolylamine (i.e., TTA and TTA+). J. M. Lupinski et al., *J. Polymer Science* C 16:1561 (1967), discusses electrically conductive polymers consisting of a polycation and neutral and anionic 7,7,8,8-tetracyanoquinodimethane.

Limburg et al., U.S. Pat. No. 4,338,222, discloses an electrically conducting, three-component composition comprising: a polycarbonate matrix; an organic hole transport compound (particularly tetraaryl diamines); and the reaction product of the organic hole transport compound and an oxidizing agent capable of accepting one electron from the hole transport compound.

Hays et al., U.S. Pat. No. 5,300,339, discloses an overcoating comprising at least three constituents: a charge transport compound (particularly an aryl diamine), a polymer binder (particularly a polycarbonate or a polyethercarbonate), and an oxidizing agent.

None of the preceding references teaches conjugated polymers such as controllably conductive polymer compositions comprising thiophene- or oligothiophene-containing polymers; or inert elastomeric polymers, such as isoprene- or butadiene-based copolymer elastomers or polyurethane elastomers.

SUMMARY OF THE INVENTION

The present invention relates to controllably, electrically conductive polymer compositions combining a charge transport material and a dopant that accepts at least one electron from a charge transport moiety of the charge transport material.

The charge-transporting material of the present composition comprises: (a) an inherently charge transporting polymer such as a conjugated, one-dimensional polymer where charge transport can occur along the polymer chain (such as a thiophene- or oligothiophene-containing polymer); or (b) an inert polymer elastomer (such as a butadiene- or isoprene-containing copolymer elastomer or a polyurethane elastomer) and at least one charge transport molecule.

In particular, the present compositions advantageously use stable organic salts as dopants in the charge transport materials to yield semiconductive compositions whose electrical or "dark" conductivity may be reproducibly controlled, through dopant concentration, within a desired range of conductivities. These organic salt dopants are soluble in organic solvents. Preferred organic salts comprise an aminium salt (e.g., a tris-(p-phenyl)aminium cation like tri-p-tolylaminium) and a suitable counter anion (e.g., $SbF_6^-$ or $SbCl_6^-$).

Furthermore, the composition's conductivity parameters and resulting charge relaxation time constant may be further controlled by varying the content of the charge-transporting moiety in the backbone of the inherently charge-transporting polymer composition, or by varying the concentration of charge transport molecules in the conductive composition comprising an inert polymer and at least one charge transport molecule.

The conductive compositions of the invention provide improved, stable and uniform conductivity, as well as latitude and control in selecting a desired dielectric charge relaxation time constant for the composition. Dielectric relaxation is the process whereby perturbations of a material's charge distributions, produced by applying an external electric field, decay upon the field's removal. The dielectric charge relaxation time constant is a measure of this decay time, thereby reflecting the conductivity of the material. The shorter the relaxation time constant, the more conductive is the material. For example, a charge relaxation time of about 1 microsecond to about 10 seconds can be achieved for a composition of this invention. The charge relaxation time constant of a film is measured by applying a pulsed voltage to a film sample sandwiched between electrodes and monitoring the time dependence of the charge flow to the electrodes.

Stable, gravimetric control of electrical conductivity in the present improved compositions, independent of polymerization or other processing steps, is of considerable value in a number of applications.

The conductive compositions of the invention may be used as coatings in an apparatus for developing a latent image recorded on a photoconductive surface in an electrophotographic imaging or printing machine of the type in which an electrostatic latent image recorded on a photoconductive member is developed to form a visible image thereof. For example, the compositions may be used to provide improved toner donor roll coatings as well as overcoatings for electrophotographic development subsystem donor rolls. As well, the present compositions may be used to protect electrodes on a donor roll from wear, and/or to prevent electrical shorting with a developer material's conductive carrier beads.

For instance, the present compositions, having controllable, reproducible conductivities of about $10^{-9}$ to $10^{-10}$ S or (ohm-cm)$^{-1}$, may be used advantageously as coatings in scavengeless or hybrid scavengeless development systems, e.g., scavengeless electroded donor rolls as described herein and in U.S. Ser. No. 08/037,836 (filed Mar. 29, 1993) now U.S. Pat. No. 5,386,277, the entire contents of which are incorporated herein by reference. The invention thus includes a coated donor or transport member (e.g., a donor roll), comprising a core and an improved coating comprised of a composition of the invention. Preferably, the coated donor roll has an overcoating with a desired volume electrical conductivity (i.e., the reciprocal of resistivity) in the range of about $10^{-7}$ (ohm-cm)$^{-1}$ to about $10^{-13}$ (ohm-cm)$^{-1}$, and preferably from about $10^{-9}$ (ohm-cm)$^{-1}$ to about $10^{-10}$ (ohm-cm)$^{-1}$. If the conductivity is too high (i.e., resistivity is too low), electrical breakdown of the coating can occur when a voltage is applied to an electrode or material in contact with the coating. When the resistivity is too high (i.e., conductivity too low)—for example, about $10^{13}$ ohm-cm—charge accumulation on the coating's surface creates a voltage which changes the electrostatic forces acting on the toner. Also, resistive heating can wear down the coating by causing holes to form.

The invention also includes an electrophotographic printing machine, a developing apparatus, and a coated toner donor or transport member comprising a composition of the invention.

In liquid image development systems, image transfer systems can employ a semi-insulative/semiconductive composition of the invention in intermediate transfer belts, where the composition's semi-insulating conductivities would permit electrostatic transfer of the developed image. These intermediate belts must also have an acceptable level of compliance to achieve a necessary, intimate image transfer to paper. This application would use compliant embodiments of the present controllably conductive compositions, for example, comprising inert polymer elastomers, such as isoprene- or butadiene-based copolymer elastomers or polyurethane elastomers that are molecularly doped with an oxidizing agent in addition to charge-transport molecules.

BRIEF DESCRIPTION OF THE DRAWINGS

FIGS. 1(*b*) and 1(*c*) show the absorption spectra of poly(3-hexylthiophene) doped with 5% and 20% by weight, respectively, of tri-p-tolylaminium antimony hexachloride, TTA+$SbCl_6$—.

DETAILED DESCRIPTION OF EMBODIMENTS

Figure 1A:
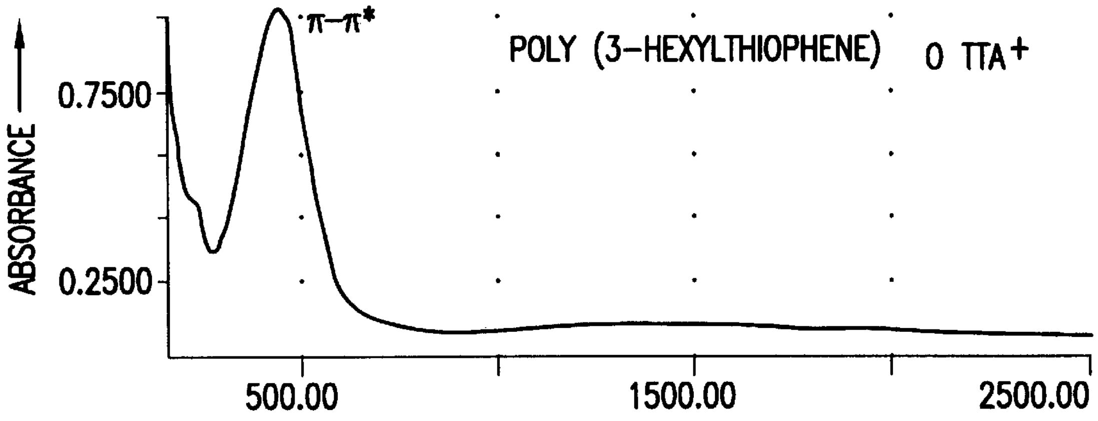
FIG. 1(*a*) shows the absorption spectrum of a nominally undoped poly(3-hexylthiophene) film. The first strong absorption peak centered at about 500 nm is the well-documented n-n* transition peak characteristic of poly(3-hexylthiophene).

The present invention demonstrates that organic salt dopants may be used to chemically change and to control electrical conductivity in diverse polymeric materials, including conjugated charge transport polymers that are soluble in organic solvents. The present conductive compositions make use of polymeric materials such as: conjugated polymers having unique, quasi-one-dimensional charge transport processes, such as thiophene- or oligothiophene-containing polymers; and compliant, inert polymers endowed with charge-transport properties by charge transport molecule dopants.

The compositions of the invention combine at least two components, a charge-transporting material and a dopant capable of accepting at least one electron from at least one charge-transporting moiety in the material.

The charge-transporting material comprises: (a) an inherently charge-transporting polymer; or (b) an inert or poorly transporting elastomer and at least one charge-transporting molecule incorporated therein by, e.g., molecular doping. In particular, the charge transporting material comprises at least one polymer selected from the group consisting of: a thiophene-containing polymer; an oligothiophene-containing polymer; a butadiene- or isoprene-based copolymer elastomer; and a polyurethane elastomer.

Inherently charge-transporting, conjugated polymers in the present compositions comprise organosoluble thiophene- or oligothiophene-containing tetramers or higher-order polymers, wherein the charge-transporting moieties lie within the thiophene or oligothiophene groups. These polymers preferably have a molecular weight range of about 10,000–200,000.

In one preferred embodiment, thiophene containing polymers that are preferably organo-soluble may be poly (thiophene)s represented by formula I, or poly(thienylene vinylene)s represented by formula II:

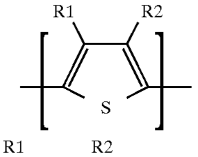
(I)

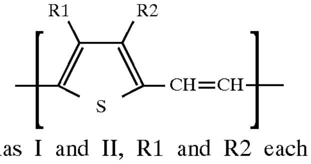
(II)

In formulas I and II, R1 and R2 each independently represents hydrogen or a solubilizing group. As solubilizing groups, R1 and R2 may each comprise at least one member selected from the group consisting of: (1) an alkyl group having about 2–18 carbon atoms, such as n-butyl, t-butyl, hexyl, t-octyl, n-octadecyl, cyclohexyl and the like; (2) alkoxy and phenoxy groups, such as n-butoxy, t-butoxy, n-hexyloxy, phenoxy, phenylthio, n-octyloxy and the like; and (3) aromatic groups such as phenyl, biphenyl, napthalenyl and the like . Examples of preferred polythiophenes include poly(3-hexylthiophene), poly(3-cyclohexylthiophene) and poly(3-hexyloxythiophene).

In another embodiment, thiophene- and oligothiophene-containing polymers comprise thiophene-containing polyesters, polycarbonates, polyurethanes or vinyl polymers. Thiophene- and oligothiophene-containing polymers also include thiophene-containing polyether carbonates derived from polyether carbonates such as those disclosed in U.S. Pat. No. 5,300,339 and U.S. Ser. No. 08/037,836, herein incorporated by reference.

In the thiophene-/oligothiophene-containing polymers of the following formulas III–VII, R1 and R2 each independently represents at least one member selected from the group consisting of: (1) a hydrogen; (2) an alkyl group such as such as n-butyl, t-butyl, hexyl, t-octyl, n-octadecyl, cyclohexyl, and the like; (3) alkoxy and phenoxy groups, such as n-butoxy, t-butoxy, n-hexyloxy, phenoxy, phenylthio, n-octyloxy, and the like; and (4) aromatic groups such as phenyl, biphenyl, napthalenyl, and the like.

A preferred thiophene-containing polyester is represented by formula III:

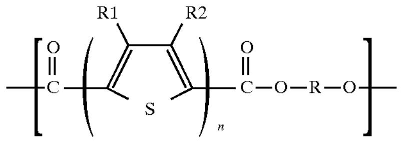

(III)

wherein n=1–6; said polyester results from the polymerization reaction of (a) at least one carboxyl group on the thiophene moiety and (*b*) a diol comprising at least one member selected from the group consisting of: 1,3-propanediol; 1,6-hexanediol; diethylene glycol; 1,3-benezenedimethanol; bisphenol A; bisphenol Z; bisphenol S; 4,4'-dihydroxy-diphenol-2,2'-butane; 4,4'-dihydroxy-diphenylether; catechol (i.e., 1,2benzenediol); resorcinol (i.e., 3-hydroxyphenol); hydroquinone (i.e., p-dihydroxybenzene); and the like; and R is derived from said diol.

A preferred thiophene-containing polyurethane is represented by formula IV:

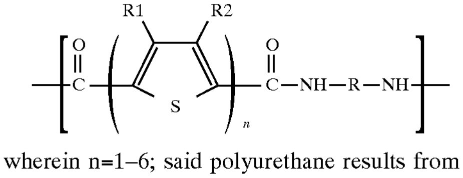

(IV)

wherein n=1–6; said polyurethane results from the polymerization reaction of (a) at least one carboxyl groups on the thiophene moiety and (*b*) a diamine comprising at least one member selected from the group consisting of 1,6-hexanediamine, 1,3-benezenediamine, 1,4-benezenediamine, p-xylylenediamine, and the like; and R is derived from said diamine.

A preferred thiophene-containing polycarbonate is represented by formula V:

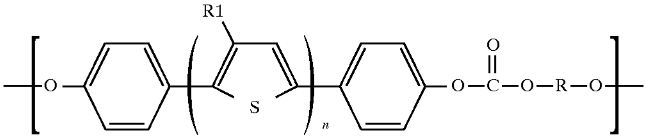

(V)

wherein n=1–6; said polycarbonate results from the polymerization reaction of (a) at least one bisphenol thiophene monomer and (b) at least one bischloroformate derived from one of the following diols: 1,3-propanediol; 1,6-hexanediol; diethylene glycol; 1,3-benezenedimethanol; bisphenol A; bisphenol Z; bisphenol S; 4,4'-dihydroxy-diphenol-2,2'-butane; 4,4'-dihydroxy-diphenylether; catechol; resorcinol; hydroquinone; and the like.

A preferred thiophene-containing vinyl polymer, including a copolymer or a tercopolymer, is represented by formula VI:

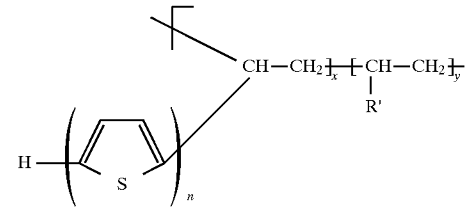

(VI)

wherein n=1–6 and R' comprises an alkyl or an aromatic group, such as n-hexyl, n-octyl, phenyl, biphenyl, naphthanyl, and the like. The ratio x/y is about 10/90–100/0, preferably 10/90–90/10.

Compliant inert polymers that are not inherently charge transporting comprise elastomers or rubbers, preferably butadiene- or isoprene-based copolymer or polyurethane elastomers. The inert elastomeric polymers have preferred molecular weight ranges of about 10,000–200,000. Especially advantageous butadiene- or isoprene-based copolymer elastomers include acrylonitrile-butadiene random or block copolymers, styrene-butadiene random or block copolymers, or styrene-isoprene random or block copolymers. Advantageous polyurethane elastomers include aromatic polyether-based polyurethanes and butadiene- or isoprene-containing polyurethanes. Suitable inert polymer elastomers for the present compositions may be selected with reference to W. Hofmann, *Rubber Technology Handbook* (1988), pages 39–40.

When the charge-transporting material comprises an inert polymer and charge transport molecules, a preferred charge transport molecule comprises at least one member selected from the group consisting of an amine, a hydrazone, a carbazole, and a pyrazoline. Suitable charge transport molecules are dissolved or molecularly dispersed in an inert polymer binder, as discussed above, and may be selected from the amines, hydrazones, carbazoles, and pyrazolines typically used in two-layer photoreceptors. A preferred charge-transport molecule comprises N,N'-diphenyl-N,N'-di-(3-methyl-phenyl)-[1,1'-biphenyl-4,4'-diamine] or N,N'- di-(4-methlylphenyl)-N,N'-di-(4-ethlylphenyl)-[1,1'-biphenyl-3,3'-dimethyl-4,4'-diamine]. Other suitable charge transport molecules include, for example, an oxadiazole, a triphenylamine, a diamine, or an arylamine as disclosed in U.S. Pat. Nos. 4,338,222, or 5,300,339 or U.S. Ser. No. 08/037,836. Additional charge transport polymers may also be incorporated into the present composition's charge-transporting materials, such as the thiophene- or oligothiophene-containing polymers, to adjust the charge-transporting properties.

These electrically active, charge-transporting materials should be capable of being partially oxidized by the dopant and hence able to support the motion of "holes" or electron accepting sites through unoxidized moieties in the charge-transporting material.

The dopant in the invention's controllably conductive composition must be capable of accepting at least one electron per molecule from charge-transporting moieties in the polymer and may be selected from a variety of materials. More than one dopant can be employed in the present composition. It is believed that, in the presence of an electron-accepting or oxidizing agent, electrons are donated to create the oxidized charge-transporting moieties in the material, which function as carrier sites for holes that are transported through the unoxidized charge-transporting moieties.

The dopant comprises an oxidizing agent, preferably a stable organic salt. A suitable organic salt dopant is an aminium salt, comprising an aminium radical cation and at least one suitable counterion (i.e. anion) to the aminium radical, X–, represented by formula VII:

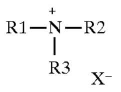

(VII)

wherein R1 and R2 each independently represents an aromatic group; and R3 is an aromatic or aliphatic group preferably having 2–18 carbon atoms. R1 and R2 can comprise a hydrogen or an organo solubilizing group selected from the group consisting of an alkyl group, an alkoxy group, a phenoxy group and an aromatic group. A preferred R3 aromatic group comprises at least one member selected from the group consisting of 3-methylphenyl; 4-methylphenyl; 4-t-butylphenyl; 2,4-dimethylphenyl; 2,4,6-trimethylphenyl; 3,5-di-t-butylphenyl, 4-chlorophenyl; 2,4-dichlorophenyl; 4-bromophenyl; 4-fluorophenyl; 4-trifluoromethylphenyl; 4-trimethylsilylphenyl; 4-cyanophenyl; 2-methylphenyl; 4-methoxyphenyl; 4-acetylphenyl; 2-methoxy-4-methylphenyl; 4-ethylesterphenyl; and naphthyl. A preferred R3 aliphatic group comprises at least one member selected from the group consisting of n-butyl; isopropyl; t-butyl; 1-adamatyl; 2-adamatyl; benzyl; cyclohexyl; and t-octyl. The counterion X– preferably comprises at least one member selected from the group consisting of $BF_4$, $PF_6$, $ASF_6$, $SbF_6$, $SbCl_6$, $ClO_4$, trifluoroacetate, toluenesulfonate, trifluorosulfonate, tetraphenylborate, tetrakis(4-fluorophenyl)borate, and tetrakis(4-trifluoromethylphenyl)borate.

Another suitable organic aminium salt comprises a bridged aminium radical cation and at least one suitable counterion to the radical, X–, represented by formula VIII:

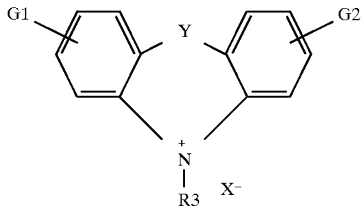

(VIII)

wherein R3 is an aromatic or aliphatic group; Y is at least one member selected from the group consisting of a single bond, O, S, $CH_2$, $CH_2—CH_2—$, $C(CH_3)_2$, $C(phenyl)_2$, $CH_2$, CH═CH, $OCH_2—CH_2O$, C═O, and the like; G1 and G2 each independently represents a substituent on the phenyl group, each selected from the group consisting of an alkyl, a halogen, a cyano, an acetyl, a methoxy, and an ethyl ester; and X– is a suitable counterion (i.e. anion) to the aminium radical. A preferred R3 aromatic group comprises at least one member selected from the group consisting of 3-methylphenyl; 4-methylphenyl; 4-t-butylphenyl; 2,4-dimethylphenyl; 2,4,6-trimethylphenyl; 3,5-di-t-butylphenyl, 4-chlorophenyl; 2,4-dichlorophenyl; 4-bromophenyl; 4-fluorophenyl; 4-trifluoromethylphenyl; 4-trimethylsilylphenyl; 4-cyanophenyl; 2-methylphenyl; 4-methoxyphenyl; 4-acetylphenyl; 2-methoxy-4-methylphenyl; 4-ethylesterphenyl; and naphthyl. A preferred R3 aliphatic group comprises at least one member selected from the group consisting of n-butyl; isopropyl; t-butyl; 1-adamatyl; 2-adamatyl; benzyl; cyclohexyl; t-octyl. X– preferably comprises at least one member selected from the group consisting of $BF_4$, $PF_6$, $ASF_6$, $SbF_6$, $SbCl_6$, $ClO_4$, trifluoroacetate, toluenesulfonate, trifluorosulfonate, tetraphenylborate, tetrakis(4-fluorophenyl)borate, and tetrakis(4-trifluoromethylphenyl)borate.

The aminium or bridged aminium salts are derived from the oxidation of their respective neutral amine species, and can have any suitable anion as the counterion.

Particularly advantageous aminium radicals of formula VII are derived from trisphenylamines, particularly para-substituted ones: i.e., tris(p-phenyl)amines. Specific examples include tris(4-bromophenyl)amine; tris(4-chlorophenyl)amine; tris(4-fluorophenyl)amine; tris(p-tolyl)amine; bis(4-methylphenyl)-(4"-chlorophenyl)amine; bis(4-chlorophenyl)-(4"-methylphenyl)amine; and the like.

Other suitable dopants include organic salts comprised of a cation selected from the group consisting of a triphenyl methyl+; tetraethylammonium+; benzyl dimethylphenyl ammonium+; 2,4,6-trimethyl pyrillium+; Ag+; K+; Na+; NO+; and a suitable anion selected from the group consisting of $BF_4$—, $PF_6$—, $AsF_6$—, $SbF_6$—, $SbCl_6$—, $ClO_4$—, toluenesulfonate, tetraphenylborate, and tetrakis(4-fluorophenyl)borate, tetrakis(4-trifluoromethylphenyl)borate.

Other suitable oxidizing dopants include tris(4-bromophenyl)ammonium hexachloroanthimonate; ferric chloride, both hydrated and anhydrous; trifluoroacetic acid; 2,4,6-trinitrobenzene sulfonic acid; dichloromaleic anhydride; tetrabromophthalic anhydride; 2,7-dinitro9-fluorenone; 2,4,7-trinitro-9-fluorenone; tetraphenyl phthalic anhydride; $SeO_2$; and $N_2O_4$.

One procedure for the preparation of the conductive compositions comprises dissolving the charge transporting polymer (e.g., poly(3-hexylthiophene) in a suitable solvent (e.g., methylene chloride) and stirring with a magnetic stirrer until a complete solution is achieved. The dopant (e.g., an oxidizing organic salt) is added and the stirring continued to assure uniform distribution. Alternatively, a solution can be made of an inert polymer (e.g., styrene-butadiene-styrene block copolymer) and charge-transport molecules (e.g. N,N'-diphenyl-N,N'-di-(3-methyl-phenyl)-[1,1'-biphenyl-4, 4'-diamine] or N,N'-di-(4-methlylphenyl)-N,N'-di-(4-ethlylphenyl)-[1,1'-biphenyl-3,3'-dimethyl-4,4'-diamine]) in a suitable solvent. Then a dopant is added and stirred in until uniform distribution is achieved. Thin films of the resulting solution can be applied where needed. For instance, a core of a toner donor roll may be bar-, spray- or dip-coated with the present charge-transporting, conductive polymer composition.

The solvent can be selected from methylene chloride, chlorobenzene, toluene, or tetrahydrofuran, or a mixture thereof. The dopant concentration can range from about 0.1 percent by weight up to about 50 percent by weight, relative to the charge-transporting polymer or the charge transport molecule content, as the case may be. A charge-transporting polymer composition comprises about 1–50% by weight, preferably from about 5 weight percent to 27 weight percent, of dopant. In inert elastomer compositions, an advantageous organic salt dopant range is about 0.1–20% by weight, preferably about 0.5–15% by weight, relative to the charge transport molecule content. The exact dopant concentration depends on the relaxation time constant desired for the conductive polymer composition. The film thickness of a coating comprising the present composition can, for example, range from about 1 microns to 50 microns, preferably 5–30 microns, depending on the application.

The carrier site concentration, and hence the conductivity, can be varied by changing the concentration of the oxidizing dopant. An alternative method for varying the conductivity or relaxation time constant is to modify the average velocity of the hole-transport carrier by changing the concentration of the charge transport moieties in the charge-transporting polymer. This can be done by changing weight percent of the thiophene groups in a thiopehene containing polymer or the concentraction of charge transport molecules.

Conductive and semi-conductive/semi-insulative compositions of the invention comprising elastomeric, inert polymers retain their elasticity, in contrast to some known charge-transporting polymers such as polyether-carbonates. The present elastomer compositions may be used as compliant, robust semi-conductive/semi-insulative belts in liquid image development systems. Semi-insulative belts, comprising a substrate coated with a composition of the invention, can be used in intermediate transfer processes. As well, semi- to near-insulative elastomer compositions can be used to make a hybrid, liquid-compatible, compliant photoreceptor, comprising a ground plane substrate coated with a photosensitive photogenerator layer overcoated with a compliant composition of the invention.

Compositions of the invention, with their advantages of chemical and conductive stability over time, have particular utility in an electrophotographic imaging or printing machine of the type in which an electrostatic latent image recorded on a photoconductive member is developed to form a visible image thereof. The compositions may, for example, be used in scavengeless or hybrid scavengeless electroded donor rolls, comprising, e.g., electrodes overcoated with a composition of the invention.

Embodiments of the present invention also include the following. A coated transport member comprises a core with a coating comprised of a composition of the invention. In particular a coated toner transport member comprises a core—comprising conductive materials such as polymers or metals (e.g., aluminum), or dielectric materials (e.g., vinyl ester, phenolic, polycarbonate, epoxy—and a coating thereover of a composition of the invention. An apparatus for developing a latent image recorded on a surface (e.g., photoconductive recording surface) includes: a housing defining a chamber storing a supply of developer material comprising carrier and toner; a coated toner donor or transport member, comprising a core coated with a composition of the invention, spaced from the recording surface and being adapted to transport toner to a region opposing the recording surface; transport structure, such as a roll, for advancing developer material in the chamber of said housing, said transport structure and said donor member cooperating with one another to define a region wherein a substantially constant quantity of toner having a substantially constant triboelectric charge is deposited on said donor member; and electrodes positioned on said donor member near the surface of a dielectric core of said donor member, said electrodes being electrically biased to detach toner from said donor member to form a toner cloud for developing the latent image.

Another application for the present compositions includes an electrophotographic printing machine, wherein an electrostatic latent image recorded on a photoconductive member is developed to form a visible image thereof. This printing machine includes an apparatus for developing a latent image recorded on a surface, similar to the preceding developing apparatus, but wherein said donor member may or may not be coated with a composition of the invention, and said transport structure for advancing developer material within said housing comprises a core coated with a composition of the invention.

Compositions of the invention enable better control of conductivity and improved wear resistance in conductive components of an electrophotographic developing apparatus, as well as improved image quality. The conductive compositions, particularly the compliant embodiments, enable lower production costs in electrophotographic apparatuses and processes, by reducing the number of needed parts (such as intermediate transfer belts) and significantly reducing finishing costs, as compared to known electrophotographic systems.

Since the art of electrophotographic printing is well known, the various processing stations employed in a printing machine will be shown hereinafter schematically and their operation described briefly with reference thereto.

Figure 3:
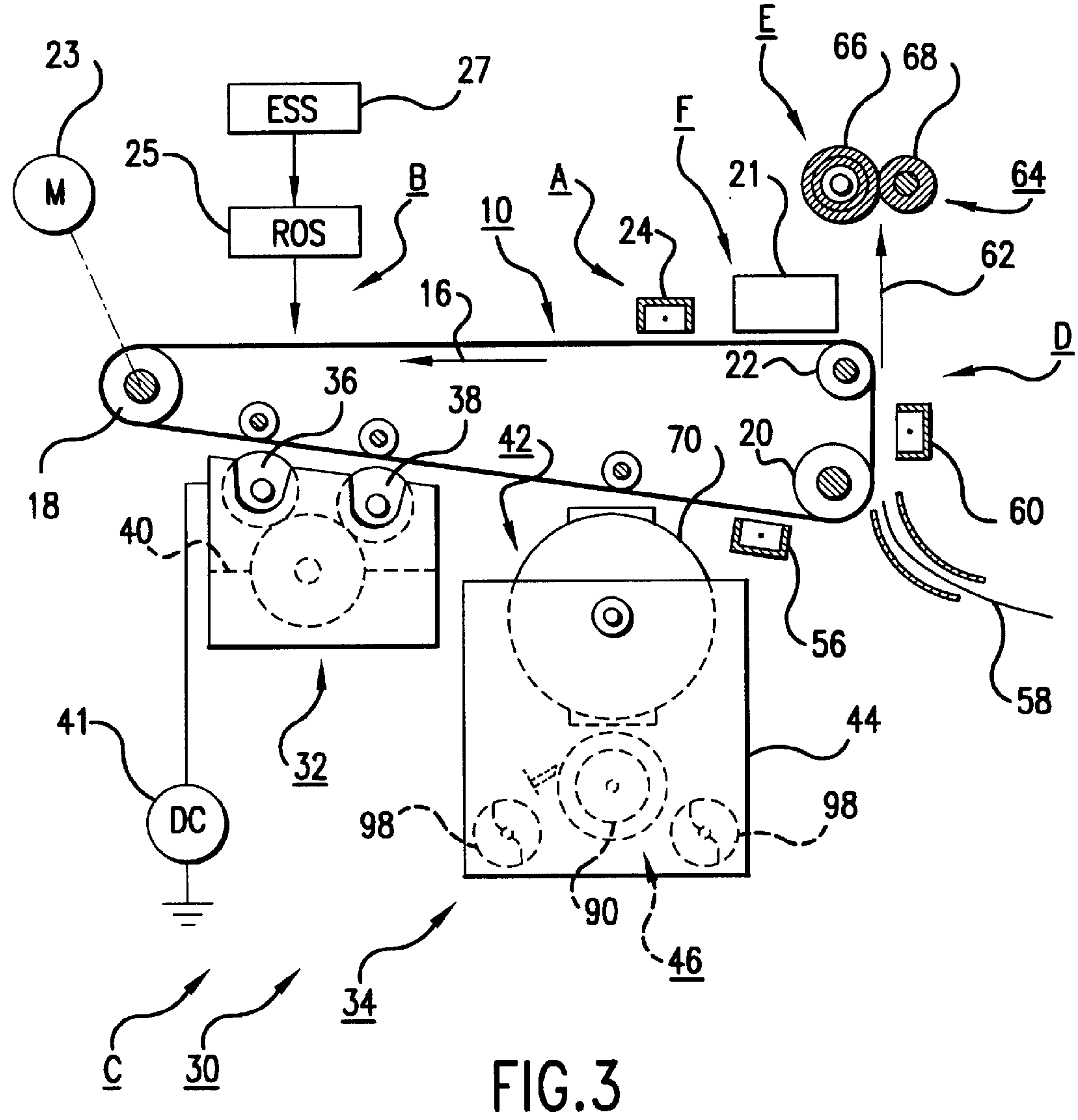
FIG. 3 is a schematic elevational view of an illustrative electrophotographic printing or imaging machine or apparatus incorporating an image development apparatus including a composition of the present invention.

FIG. 3 shows an illustrative electrophotographic machine having incorporated therein the development apparatus and composition of the present invention. The electrophotographic printing machine employs a photoconductive belt 10 comprised of a photoconductive surface and an electrically conductive substrate and mounted for movement past charging station A, exposure station B, developer station C, transfer station D and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, one or more of which can be used as a drive roller(s) and the rest of which can be used to provide suitable tensioning of the photoreceptor belt 10. Motor 23 rotates roller 18 to advance belt 10 in the direction of arrow 16, and roller 18 is coupled to motor 23, for example, by a belt drive.

Successive portions of belt 10 pass initially through charging station A, where a corona discharge device 24 (such as a scorotron, corotron or dicorotron) charges the belt

10 to a selectively high uniform positive or negative potential, $V_0$. Any suitable known control may be employed for controlling the corona discharge device 24.

Next, the charged portions of the photoreceptor surface are advanced through exposure station B. At exposure station B, the uniformly charged photoreceptor or charge retentive surface 10 is exposed to a laser based output scanning device 25 which causes the charge retentive surface to be discharged in accordance with the output from the scanning device. Preferably, the scanning device is a three-level laser raster output scanner. Alternatively, the raster output scanner could be replaced by a conventional xerographic exposure device. An electronic subsystem 27 provides for control of the raster output scanner as well as other subassemblies of the device or apparatus.

The photoreceptor, which is initially charged to a voltage $V_0$, undergoes dark decay to a level $V_{ddp}$ equal to about −900 volts. When exposed at the exposure station B, it is discharged to $V_c$ equal to about −100 volts which is near zero or ground potential in the highlight color parts of the image (that is, color other than black). The photoreceptor is also discharged to $V_w$ equal to approximately −500 volts imagewise in the background (white) image areas.

At development station C, a development system 30 advances developer materials into contact with the electrostatic latent images. The development system 30 comprises first and second developer apparatuses 32 and 34. The developer apparatus 32 comprises a housing containing a pair of magnetic brush rollers 36 and 38. The rollers advance developer material 40 into contact with the latent images on the charge retentive surface which are at the voltage level $V_c$. The developer material 40 comprises color toner particles and carrier particles, preferably magnetic carrier beads. Appropriate electrical biasing of the developer housing is accomplished by power supply 41 electrically connected to developer apparatus 32. A DC bias of approximately −400 volts is applied to the rollers 36 and 38 via the power supply 41. With the foregoing bias voltage applied and the color toner suitably charged, discharged area development with colored toner is effected.

The second developer apparatus 34 comprises a donor member in the form of a donor roll 42. Preferably, donor roll 42 comprises a dielectric core and a coating 70, with electrodes 92 and 94 embedded in the dielectric core. Electrodes 94 are electrically biased with an AC voltage relative to adjacent interdigitated electrodes 92 for the purpose of detaching toner from the donor roll so as to form a toner powder cloud in the gap between the donor roll and photoconductive surface. (The latent image attracts toner particles from the toner powder cloud to form a toner powder image on the photoconductive surface.) Electrodes 92 and 94 are biased at a DC potential of −600 volts for charged area development with a second colored toner.

Donor roll 42 is mounted, at least partially, in chamber 76 of developer housing 44. Chamber 76 also stores a supply of developer material (not shown). The developer material is preferably a conductive twocomponent developer, comprising at least carrier particles or beads having toner particles triboelectrically adhering thereto. A magnetic roller 46, disposed interiorly of the chamber of housing 44, conveys the developer material to the donor roll 42. The magnetic roller 46 is electrically biased relative to the donor roll 42 so that the toner particles are attracted from the magnetic roller to the donor roll. The development apparatus 34 and components such as 46, 90 and 98, are illustrated in greater detail with reference to FIG. 4.

A support material 58, such as a sheet of paper, is moved into contact with the toner image at transfer station D. The sheet of support material is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of belt 10 in a timed sequence so that the toner powder image developed thereon contacts the advancing sheet of support material at transfer station D.

Since the composite image developed on the photoreceptor consists of both positive and negative toner, a positive pretransfer corona discharge member 56 is provided to condition the toner for effective transfer to the substrate using negative corona discharge.

Transfer station D includes a corona generating device 60 which sprays ions of a suitable polarity onto the backside of sheet 58. This attracts the charged toner powder images from the belt 10 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the apparatus.

After the sheet of support material 58 is separated from photoconductive surface of belt 10, residual toner particles carried by the nonimage areas on the photoconductive surface are removed at cleaning station F. A magnetic brush cleaner housing 21 is disposed at the cleaning station F. A cleaning apparatus within housing 21 comprises a conventional magnetic brush roll structure that causes carrier particles in the cleaner housing to form a brush-like orientation relative to the roll structure and the charge retentive surface. It also includes a pair of detoning rolls for removing residual toner particles from the brush.

Subsequent to cleaning, a discharge lamp (not shown) floods the photoconductive surface with light to dissipate any residual electrostatic charge remaining prior to the charging thereof for the next imaging cycle.

Figure 4:
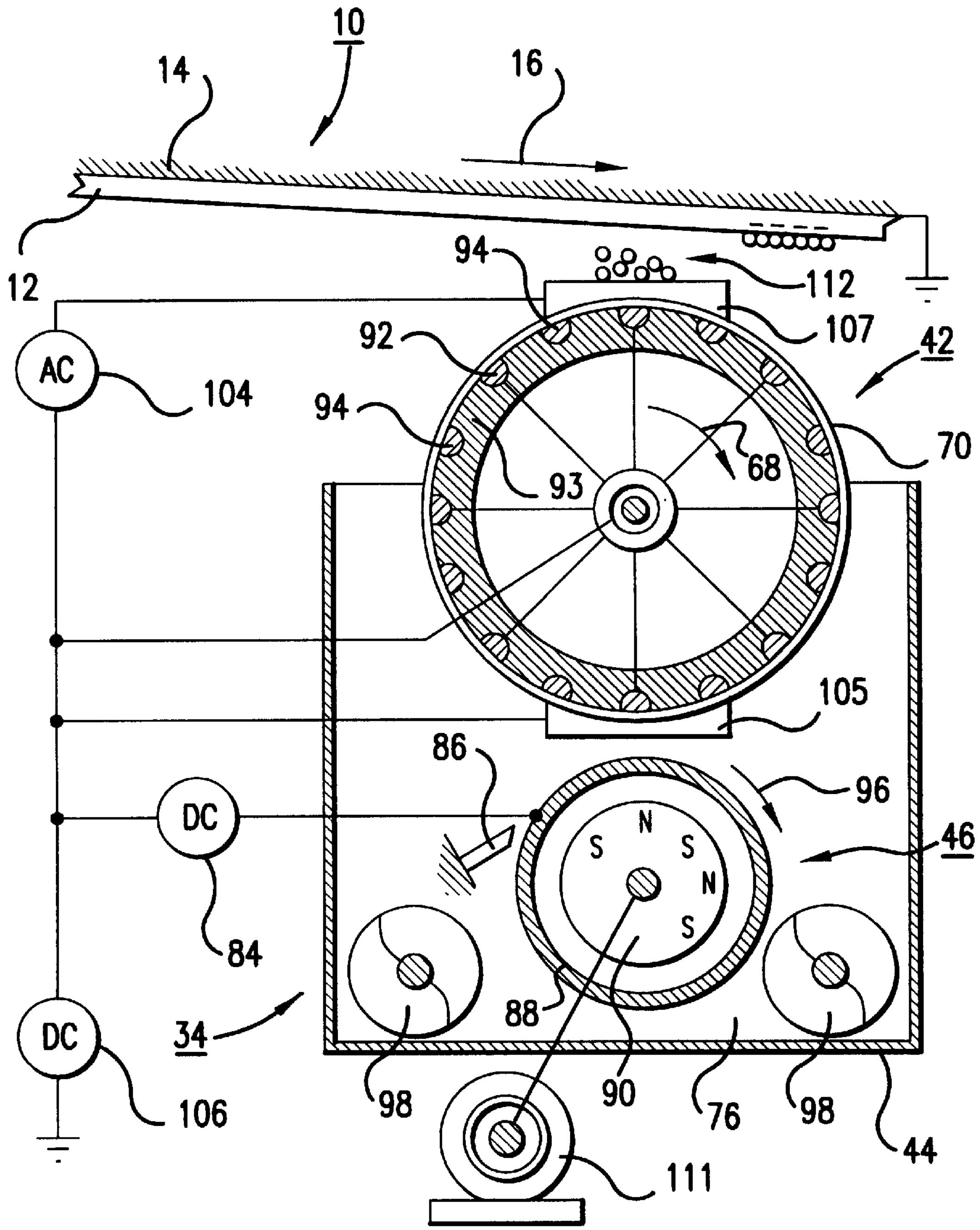
FIG. 4 is a schematic elevational view showing the development apparatus used in the FIG. 3 printing machine.

FIG. 4 shows development system 34 in greater detail with AC and DC power sources. Development system 34 includes a housing 44 defining a chamber 76 for storing a supply of developer material therein. A donor roll 42 and a magnetic roller 46 are mounted in chamber 76 of housing 44. The donor roll 42 can be rotated in either the "with" or "against" direction relative to the direction of motion of the belt 10. In FIG. 4, donor roll 42 is shown rotating in the direction of arrow 68, that is the "with" direction. Similarly, the magnetic roller 46 can be rotated in either the "with" or "against" direction relative to the direction of motion of the donor roll 42. In FIG. 4, magnetic roller 46 is shown rotating in the direction of arrow 96, that is the "against" direction.

The donor roll 42 is spaced approximately 250 $\mu$m from the photoconductive surface 12. The donor roll 42 includes an insulative core 93 having substantially equally spaced, interdigitated electrodes 92 and 94 on the core's exterior circumferential surface. The core 93 preferably comprises a dielectric base, such as a polymeric material like a vinyl ester.

A charge-relaxable coating 70 comprising a composition of the present invention may be applied to form the outer, circumferential surface of donor roll 42 and to overcoat the electrodes 92 and 94. The coating 70 is particularly useful to prevent electrical breakdown and shorting between the electrodes and conductive magnetic brush in the toner loading zone. Preferably, the charge-relaxable coating 70 has a thickness of about 25 $\mu$m, and can be applied by a number of known methods such as spray or dip coating. Specific polymeric compositions for charge-relaxable coatings must satisfy a number of requirements, including: a high dielectric breakdown strength, up to 1,500 volts across a 25 $\mu$m thick coating; low residual potential, less than 5 volts across a 25 $\mu$m thick coating; cycling stability; and wear resistance.

A motor 111 primarily supplies power to magnetic roller 46. The two sets of interdigitated electrodes 92 and 94 are supported on the dielectric core 93 of donor roll 42 in a circular orientation. The electrodes 92 and 94 are positioned in close proximity to a toner layer on the surface of donor roll 42. The electrodes 92 and 94 extend in a direction substantially parallel to the longitudinal axis of the donor roll 42. The electrodes may, for example, be 100 $\mu$m wide and spaced approximately 150 $\mu$m apart (i.e., center-to-center spacing of 250 $\mu$m). Each of the active interdigitated electrodes 94 is electrically isolated on the donor roll 42 whereas all of the passive interdigitated electrodes 92 are connected.

An alternating electrical bias (AC bias) is applied to the active interdigitated electrodes 94 by an AC voltage source 104. The applied AC establishes an alternating electrostatic field (AC fringe field) between the interdigitated electrodes 92 and 94, and hence to the nearby toner layer on donor roll 42. The time-dependent electrostatic force acting on the charged toner layer momentarily breaks the adhesive bond, serving to detach toner from the surface of the donor roller 42 to form a toner cloud 112. The height of the toner cloud 112 is such as not to be substantially in contact with the belt 10, moving in direction 16, with image area 14. The applied AC bias is referenced to a DC bias applied by a DC power source 106 to all of the electrodes of both sets of electrodes 92 and 94, so that the time average of the AC bias is equal to the DC bias applied. Thus, the equal DC bias on adjacent electrodes precludes the creation of DC electrostatic fields between adjacent electrodes which would impede toner liberation by the AC fields. The magnitude of the AC voltage is in the order of 800 to 1,200 volts peak at a frequency ranging from about 1 kHz to about 6 kHz.

The AC voltage applied voltage source 104 to the active electrodes 94 is commutated via a conductive brush 107 contacting only those electrically isolated electrodes 94 positioned in the nip between the photoconductive surface 12 and the donor roll 42. If the toned donor is subjected to the AC fringe field before the development nip, the development efficiency would be degraded. This observation implies that an AC field must be applied only in the development nip. Limiting the AC field region to a fraction of the nip width will also help to reduce toner emissions that are usually associated with other nonmagnetic development systems.

The DC bias supply 106 applies from about 0 to 1,000 volts (preferably about 300 volts) to donor roll 42, and establishes an electrostatic field between donor roll 42 and photoconductive surface 12 of belt 10 for attracting detached toner particles from toner cloud 112 to the latent image recorded on the photoconductive surface 12. The DC electric field from the electrostatic image controls the deposition of toner on the image receiver. An applied voltage of 800 to 1,200 volts produces a relatively large electrostatic field without risk of air breakdown. The use of semi-insulative coating 70 on donor roll 42 helps to prevent shorting between the interdigitated electrodes when the AC bias is applied in the development zone.

Toner metering and charging are provided by a conductive two-component developer in a magnetic brush development system. To control the electrical bias on the electrically isolated electrodes 94 when positioned in the toner metering and charging nip, a second conductive brush 105 is provided with a bias from the DC power supply 106, as illustrated in FIG. 4.

For magnetic brush loading of the donor roll 42 with a two component developer, there can be selected scavengeless hybrid, as illustrated in U.S. Pat. Nos. 5,032,872 and 5,034,775. Also, U.S. Pat. No. 4,809,034 describes two-component loading of donor rolls and U.S. Pat. No. 4,876,575 discloses another combination metering and charging device suitable for use in the apparatus of the present invention.

Toner can also be deposited on donor roll 42 via a combination metering and charging device. A combination metering and charging device may comprise any suitable device for depositing a monolayer of well-charged toner onto donor roll 42. For example, it may comprise an apparatus such as described in U.S. Pat. No. 4,459,009, wherein the contact between weakly charged particles and a triboelectrically active coating contained on a charging roller results in well-charged toner particles.

Magnetic roller 46 is used to ensure loading of donor roll 42 with a constant amount of toner having a substantially constant charge in the development gap. The deposition of a constant amount of toner having a substantially constant charge on donor roll 42 is achieved by the combination of: the spacing between donor roll 42 and magnetic roller 46; the compressed pile height of the developer material on magnetic roller 46; and the magnetic properties of the magnetic roller 46 in conjunction with the the use of a conductive, magnetic developer material. A DC bias supply 84 which applies approximately 100 volts to magnetic roller 46 establishes an electrostatic field between magnetic roller 46 and the coated donor roll 42 so that an electrostatic field is established between donor roll 42 and the magnetic roller which causes toner particles to be attracted from the magnetic roller to donor roll 42. Metering blade 86 is positioned closely adjacent to magnetic roller 46 to maintain the compressed pile height of the developer material on magnetic roller 46 at the desired level. Magnetic roller 46 includes a nonmagnetic tubular member 88, preferably made from aluminum and having a roughened exterior circumferential surface. An elongated magnet 90 is positioned inside and spaced apart from the interior surface of tubular member 88. The magnet is mounted in a stationary position. The tubular member 88 rotates in the direction of arrow 96 to advance the developer material adhering thereto into the nip defined by donor roll 42 and magnetic roller 46. Toner particles are attracted from the carrier granules on the magnetic roller to the donor roll 42.

Augers 98 are mounted rotatably in chamber 76 of housing 44 to mix and transport developer material within the chamber. The augers 98 have blades which extend spirally outwardly from a shaft 98 and advance the developer material (not shown) in an axial direction substantially parallel to the longitudinal axis of the shaft.

As successive electrostatic latent images are developed, the toner particles within the developer material are depleted. A toner dispenser (not shown) stores a supply of toner particles. The toner dispenser is in communication with chamber 76 of housing 44. As the concentration of toner particles in the developer material is decreased, fresh toner particles are furnished to the developer material in the chamber from the toner dispenser. Augers 98 in chamber 76 mix the fresh toner particles with the remaining developer material so that the resultant developer material therein is substantially uniform, with the concentration of toner particles being optimized. In this manner, a substantially constant amount of toner particles having a constant charge in chamber 76 of the developer housing 44. The developer material in chamber 76 of the developer housing 44 is magnetic and may be electrically conductive. The developer material comprises carrier and toner particles. By way of example, the carrier particles include a ferromagnetic core having a thin layer of magnetite overcoated with a non-continuous layer of resinous material. The toner particles are preferably prepared from resin particles (such as vinyl polymer) mixed with pigment particles. The developer material comprises from about 95 percent to about 99 percent by weight of carrier and from 5 percent to about 1 percent by weight of toner. Examples of toners and carriers that can be selected are illustrated in U.S. Pat. Nos. 3,590,000; 4,298,672; 4,264,697; 4,338,390; 4,904,762; 4,883,736; 4,937,166 and 4,935,326, the disclosures of which are totally incorporated herein by reference.

A coated transport member of the invention can be made by: preparing a solution of a composition of the invention that includes an amount of dopant effective to modify the electrical conductivity of the charge-transporting material of the composition to a desired conductivity; applying said solution over a core of a transport member in a thin coat; and drying the solution coated member, preferably at about 50°–100° C. for about one hour.

Conductive compositions of the invention are embodied in the following, non-limiting examples. Exemplary films comprising the conductive compositions were produced using methylene chloride solutions. Unless otherwise specified, the percentages mentioned are % by weight.

For example, a typical film is coated from a solution prepared by dissolving 0.048 grams of a charge-transporting material (such as a charge transporting polymer or inert elastomer doped with charge transport molecules) and 0.012 grams of an oxidizing dopant such as tri-p-tolylamine antimony hexachloride, $TTA+SbCl_6$— in 1.5 grams of methylene chloride. The mixture is agitated to effect a complete solution. In experiments for testing the conductivity of the present compositions, a layer of the resulting solution is coated onto a conductive substrate (e.g., an indium-tin oxide coated substrate or a titanized MELINEXT™ substrate) with a Bird film applicator. The film is dried in a forced air oven, for example, at 80° C. for 30 minutes.

EXAMPLE I

In this embodiment, a controllably conductive film comprises a conjugated polymer, poly(3-hexylthiophene), doped with the organic salt, $TTA+SbCl_6$— (in a preferred concentration range of about 5–27 weight % of the polymer).

Figure 1B:
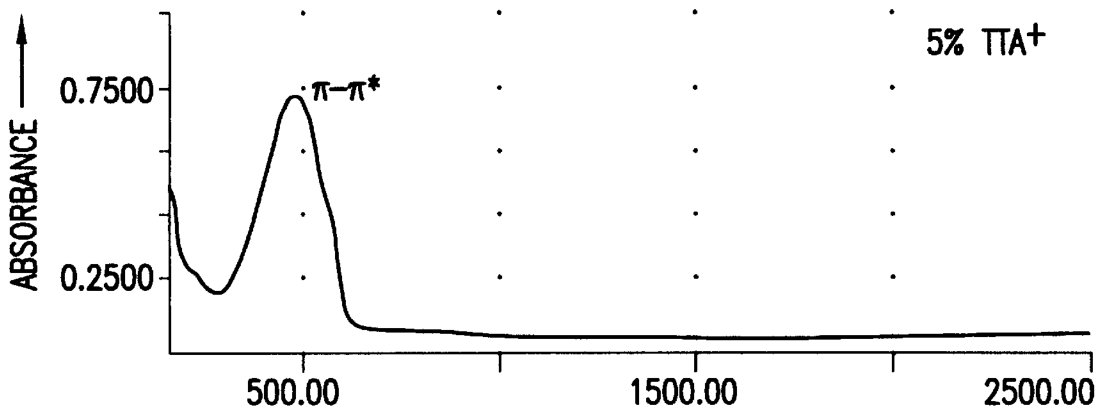
Figure 1C:
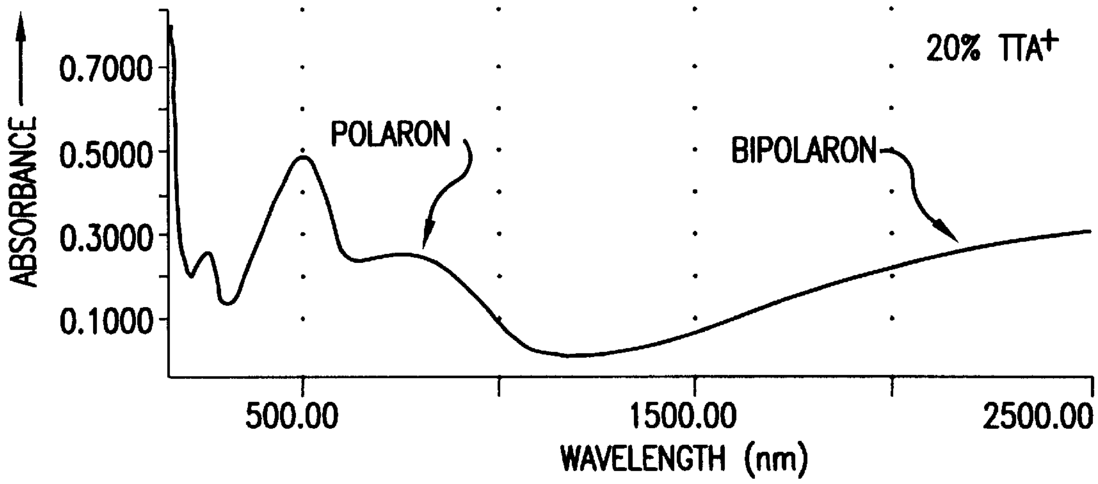

FIG. 1(*a*) shows the absorption spectrum of a nominally undoped poly(3-hexylthiophene) film synthesized by ferric chloride-catalyzed polymerization of 3-hexylthiophene. The first strong absorption peak centered at about 500 nm is the well-documented n-n* transition for poly(3-hexylthiophene) without dopants. The electrical conductivity of the nominally undoped poly(3-hexylthiophene), coated onto an indium-tin oxide (ITO) coated glass substrate, was $10^{-8}$ $(ohm\text{-}cm)^{-1}$.

FIGS. 1(*b*) and 1(*c*) show the absorption spectra of poly(3-hexylthiophene) upon doping with 5% and 20% by weight, respectively, of $TTA+SbCl_6$—. These absorption spectra demonstrate that electrochemical doping of a thiophene-containing polymer with an organic salt can be achieved to increase conductivity. In FIG. 1(*b*), the 5% dopant sample, a weak shoulder can be seen to be developing on the long wavelength side of the n-n* transition band. In FIG. 1(*c*), the 20% dopant sample, a prominent peak has appeared around 800 nm, followed by a rising absorption profile with a peak beginning to develop at 2500 nm. The 800 and 2500 nm peaks are associated with the formation of polaron and bipolaron states, respectively, in the n-n* gap, and appear upon electrochemical doping of polythiophenes such as poly(3-hexylthiophene). This shift in the absorption spectra profile towards longer wavelengths and the relative decrease in oscillator strength of the 500 nm n-n* absorption peak are characteristic of electrochemical doping and increased electrical conductivity in polythiophenes. Coated on an ITO substrate, the electrical conductivity of a poly(3-hexylthiophene) film doped with $TTA+SbCl_6$— was systematically found to increase by four orders of magnitude for a dopant level of about 27% by weight.

Examples I, III and IV demonstrate that a compliant inert polymer or elastomer binder, such as a butadiene or isoprene based block copolymer or a polyurethane elastomer, can be molecularly doped with charge-transport molecules (at about 20–50% by weight of the elastomer) and organic salts (in the range of about 0.1–20% by weight, preferably about 0.5–15% by weight, especially 0.5–10% by weight, relative to the charge transport molecules) into the semi-insulative/semi-conductive regime of interest. For instance, as indicated in FIG. 3, one can obtain a compliant semi-insulative composition having a conductivity in the range of about $10^{-7}$ to $10^{-10}$ $(ohm\text{-}cm)^{-1}$. Although the range of conductivity falls within desired levels for electrophotographic purposes, crystallization can still occur over time wherever the surface of this film is scratched or touched. Crystallization can be minimized by using appropriate charge transport molecules, as discussed below.

EXAMPLE II

The following is an embodiment of the conductive composition wherein the charge-transporting material comprises an inert polymer elastomer or rubber and at least one charge transport molecule. The inert polymer comprises a butadiene or isoprene based block copolymer. Films were made using the thermoplastic rubber Kraton™ (Shell Chemical Co.). Two types were used: 1101 Kraton D™, a styrene-butadiene-styrene block copolymer with a Durometer A hardness rating of about 71–75; and 1107P Kraton D™, a styrene-isoprenestyrene block copolymer with a hardness value of about 36–37. By mixing the two copolymers in appropriate amounts, conductive compositions having a range of hardness values can be obtained.

Using methylene chloride as the solvent, 50 weight % (with respect to the polymer binder) of a charge-transport molecule, N,N'-diphenyl-N,N'-di-(3-methyl-phenyl)-[1,1'-biphenyl-4,4'-diamine], was added to the Kraton polymer to form a coating solution for the charge transporting material. Control films were made from the resulting solution (without an oxidizing dopant), pipetted onto an ITO-coated glass substrate. Conductive films were cast from solutions of 50% N,N'-diphenyl-N,N'-di-(3-methyl-phenyl)-[1,1-'-biphenyl-4,4'-diamine]/Kraton doped with tri-p-tolylamine antimony hexachloride ($TTA+SbCl_6$—), in concentrations of 0.6–15 weight % (relative to the charge transport molecule content). After drying at room temperature, the films were further dried at 50° C. for one hour. Gold electrodes were used as the top contact.

Figure 2:
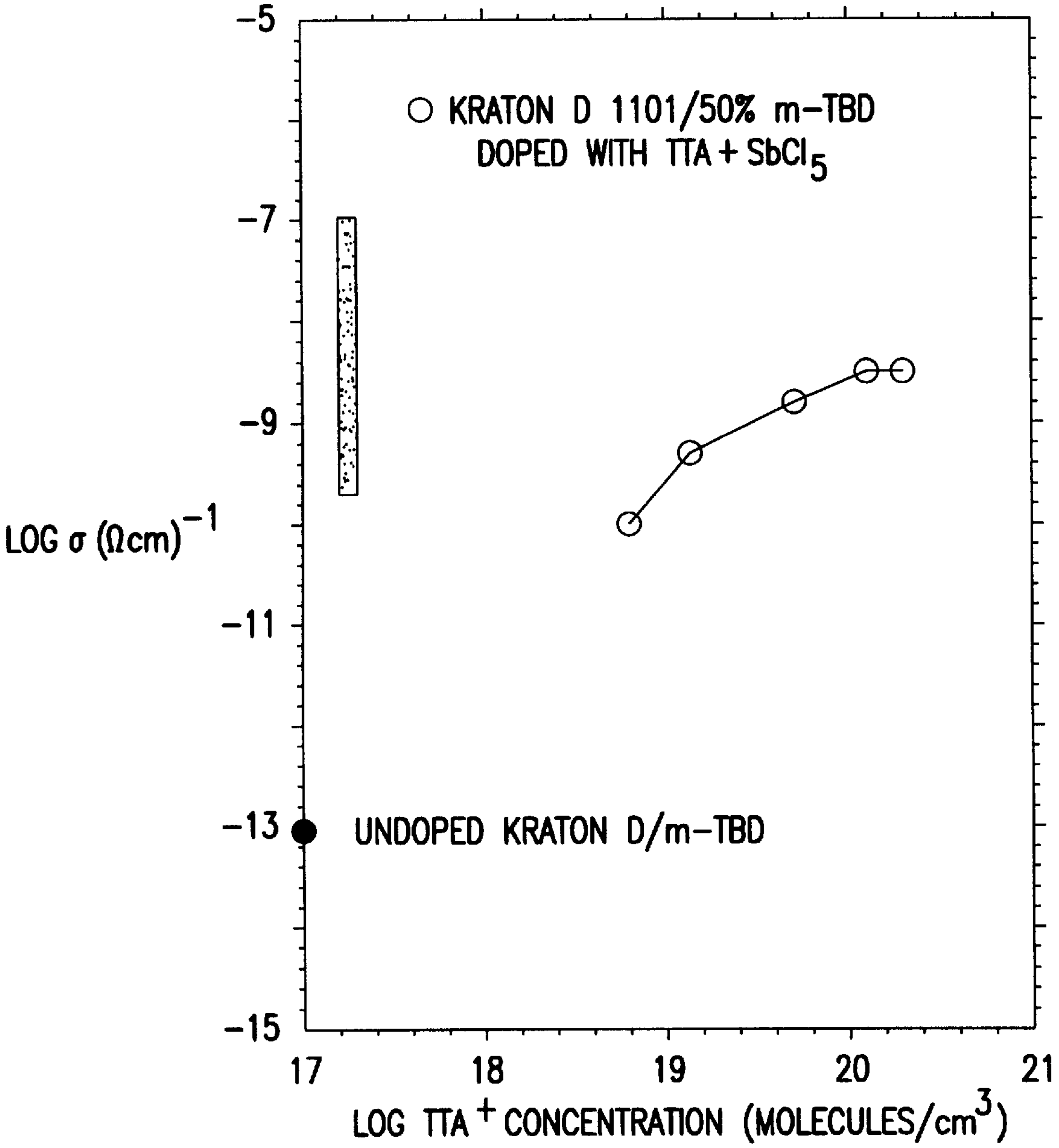
FIG. 2 shows the dark conductivity of a styrene-isobutadienestyrene block copolymer at 50% loading of N,N'-diphenyl-N,N'-di(3-methylphenyl)-1,1'-biphenyl-4,4'-diamine with different TTA+$SbCl_6$— concentrations. The depicted graph plots log conductivity (a or $(\Omega cm)^{-1}$) versus log TTA+SbCl6— concentration (molecules/$cm^3$).

FIG. 2 depicts the conductivities of the charge transporting material—1101 Kraton polymer at 50% N,N'-diphenyl-N,N'-di-(3-methylphenyl)-[1,1'-biphenyl-4,4'-diamine] loading—both with and without an oxidizing dopant. The undoped control films show very low dark conductivity of no more than $10^{-13}$ (ohm-cm)$^{-1}$. Doping with increasing amounts of TTA+$SbCl_6$— produced semiconductivities from about $10^{-10}$ to $4\times10^{-9}$ (ohmcm)$^{-1}$. As shown in FIG. 2, TTA+$SbCl_6$— concentration levels (measured in molecules/cm$^3$) of $6.4\times10^{18}$, $1.25\times10^{19}$, $5\times10^{19}$, $1.3\times10^{20}$, and $1.8\times10^{20}$, respectively produced conductivities (measured in (ohm-cm)$^{-1}$) of $1.0\times10^{-10}$, $7.0\times10^{-10}$, $1.0\times10^{-9}$, $2.0\times10^{-9}$, and $3.0\times10^{-9}$. TTA+$SbCl_6$— doping also produced color changes characteristic of increased concentrations of the N,N'-diphenyl-N,N'-di-(3-methyl-phenyl)-[1,1'-biphenyl-4,4'-diaminium] radical cation in the doped Kraton polymer compositions. That is, one observes a brown color develop as the N,N'-diphenyl-N,N'-di-(3-methyl-phenyl)-[1,1'-biphenyl-4,4'-diamine] charge transport molecules become oxidized by TTA+ cations from the organic salt. At the same time, the blue color characteristic of TTA+ presence disappears as it becomes neutral TTA, which is colorless. True molecular doping was confirmed to have occurred in the doped Kraton polymer compositions, by the observation of well-defined time of flight transits corresponding to a positive charge or hole mobility of about $10^{-6}$ cm$^2$/V sec in 1101 Kraton D™.

Conductivities achieved in various doped 1101 Kraton films ranged from about $10^{-10}$ to $3\times10^{-9}$ (ohm-cm)$^{-1}$, for dopant concentrations of up to 15%. Beyond 15% doping, the conductivity of the film remained constant. The doped 1107P Kraton™ film behaved similarly to the doped 1101 Kraton film, but displayed a maximum conductivity of about $7\times10^{-9}$ (ohm-cm)$^{-1}$.

Over time, crystallization tends to occur in both the Kraton 1101 and 1107P doped films wherever the film is touched or scratched. Replacing half the N,N'-diphenyl-N,N'-di-(3-methyl-phenyl)-[1,1'-biphenyl4,4'-diamine charge transport molecules with N,N'-di-(4-methlylphenyl)-N,N'-di-(4-ethlylphenyl)-[1,1'-biphenyl-3,3'-dimethyl-4,4'-diamine], a derivative of the former, prevents crystallization of N,N'-diphenyl-N,N'-di(3-methyl-phenyl)-[1,1'-biphenyl-4,4'-diamine] out of the film composition.

EXAMPLE III

Compliant compositions of the invention also comprise other insulative or inert butadiene-based elastomers. For instance, conductive films were made of an acrylonitrile/butadiene block copolymer rubber, such as Nipol™ VT 355 (Zeon Chemicals, Inc.). A solution was made of Nipol™ VT 355 (57%) and a charge transport hydrazone: 9-ethylcarbazole-3-carboxaldehyde-1-methyl-1-phenyl hydrazone (43%) in methyl ethyl ketone. The solution was then doped by the addition of 14 weight % (with respect to the hydrazone) of TTA+$SbCl_6$—. A film cast from this solution had a conductivity of about $10^{-9}$ (ohm-cm)$^{-1}$.

EXAMPLE IV

Compliant compositions of the invention also comprise other insulative or inert compliant polymers such as polyurethane elastomers. For instance, conductive films were made of an aromatic polyether-based polyurethane elastomer, such as Estane 5714 F-1™-(B. F. Goodrich Chemical Co.), having a Durometer A hardness value of about 80. Other hardness values can be obtained. A solution was made of Estane™ in tetrahydrofuran with 50% by weight (of solids) of the following charge-transporting hydrazone: 9-ethylcarbazole-3-carboxaldehyde-1-methyl-1-phenyl hydrazone. The solution was then doped by the addition of 13 weight % (with respect to the hydrazone) of TTA+$SbCl_6$—. A film cast from this solution had a conductivity of about $10^{-10}$ (ohm-cm)$^{-1}$.

What is claimed is:

1. A coated transport member comprising a core with a coating comprising a controllably conductive polymer composition prepared by combining a charge-transporting material and a dopant that accepts at least one electron from at least one charge-transporting moiety of the material, wherein the charge-transporting material comprises at least one polymer selected from the group consisting of:

(a) a thiophene-containing polymer;

(b) an oligothiophene-containing polymer;

(c) a butadiene-based copolymer elastomer;

(d) an isoprene-based copolymer elastomer; and (e) a polyurethane elastomer.

2. The coated transport member of claim 1, wherein the charge-transporting material comprises at least one elastomeric polymer and at least one charge-transport molecule; and wherein the elastomeric polymer is selected from the group consisting of a butadiene-based copolymer elastomer, an isoprene-based copolymer elastomer, a polyurethane elastomer and mixtures thereof.

3. The coated transport member of claim 2, wherein the elastomeric polymer is at least one member selected from the group consisting of a styrene-butadiene block copolymer, styrene-butadiene random copolymer, a styrene-isoprene block copolymer, a styrene-isoprene random copolymer, an acrylonitrile-butadiene block copolymer, an acrylonitrile-butadiene random copolymer, and an aromatic polyether-based polyurethane.

4. The coated transport member of claim 2, wherein the charge-transport molecule comprises at least one member selected from the group consisting of an amine, a hydrazone, a carbazole, and a pyrazoline.

5. The coated transport member of claim 2, wherein the charge-transport molecule comprises at least one member selected from the group consisting of N,N'-diphenyl-N,N'-di-(3-methyl-phenyl)-[1,1'-biphenyl-4,4'diamine], N,N'-di-(4-methlylphenyl)-N,N'-di-(4-ethlylphenyl)-[1,1'biphenyl-3,3'-dimethyl-4,4'-diamine], and 9-ethyl-carbazole-3-carboxaldehyde-1-methyl-1-phenyl hydrazone.

6. The coated transport member of claim 1, wherein the charge-transporting material is partially oxidized.

7. The coated transport member of claim 1, wherein the thiophene-containing polymer comprises at least one member selected from the group consisting of:

a polythiophene of formula I

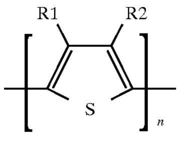

(I)

and a poly(thioenylene vinylene) of formula II, (II)

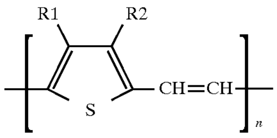

wherein R1 and R2 each comprises a hydrogen or an organo-solubilizing group selected from the group consisting of an alkyl group, an alkoxy group, a phenoxy group and an aromatic group.

8. The coated transport member of claim 7, wherein R1 and R2 each independently represents a member selected from the group consisting of n-butyl, t-butyl, hexyl, t-octyl, n-octadecyl, cyclohexyl, n-butoxy, t-butoxy, n-hexyloxy, phenoxy, phenylthio, n-octyloxy, phenyl, biphenyl, and napthalenyl.

9. The coated transport member of claim 1, wherein the polymer is a thiophene-containing polyester represented by formula III:

(III)

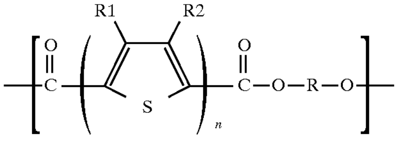

wherein n=1–6; R1 and R2 each independently represents a member selected from the group consisting of hydrogen, n-butyl, t-butyl, hexyl, t-octyl, n-octadecyl, cyclohexyl, n-butoxy, t-butoxy, n-hexyloxy, phenoxy, phenylthio, n-octyloxy, phenyl, biphenyl, and napthalenyl; said polyester results from the polymerization reaction of (a) at least one carboxyl group on the thiophene moiety and (b) a diol; and R is derived from said diol.

10. The coated transport member of claim 9, wherein the diol is at least one member selected from the group consisting of 1,3-propanediol; 1,6-hexanediol; diethylene glycol; 1,3-benezenedimethanol; bisphenol A; bisphenol Z; bisphenol S; 4,4'-dihydroxydiphenol-2,2'-butane; 4,4'-dihydroxy-diphenylether; catechol; resorcinol; and hydroquinone.

11. The coated transport member of claim 1, wherein the thiophene-containing polymer is a thiophene-containing polyurethane represented by formula IV:

(IV)

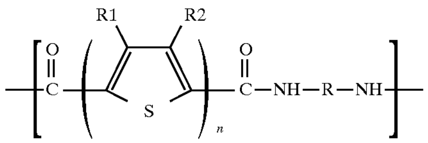

wherein n=1–6; R1 and R2 each independently represents a member selected from the group consisting of hydrogen, n-butyl, t-butyl, hexyl, t-octyl, n-octadecyl, cyclohexyl, n-butoxy, t-butoxy, n-hexyloxy, phenoxy, phenylthio, n-octyloxy, phenyl, biphenyl, and napthalenyl; and said polyurethane results from the polymerization reaction of (a) at least one carboxyl group on the thiophene moiety and (b) a diamine; and R is derived from said diamine.

12. The coated transport member of claim 11, wherein the diamine is at least one member selected from the group consisting of 1,6-hexanediamine, 1,3-benezenediamine, 1,4-benezenediamine, and p-xylylenediamine.

13. The coated transport member of claim 1, wherein the thiophene-containing polymer is a thiophene-containing polycarbonate represented formula V:

(V)

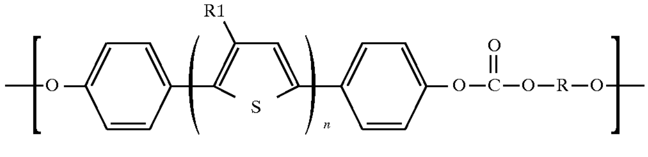

wherein n=1–6; R1 and R2 each independently represents a member selected from the group consisting of hydrogen, n-butyl, t-butyl, hexyl, t-octyl, n-octadecyl, cyclohexyl, n-butoxy, t-butoxy, n-hexyloxy, phenoxy, phenylthio, n-octyloxy, phenyl, biphenyl, and napthalenyl; said polycarbonate results from the polymerization reaction of (a) at least one carboxyl group on the thiophene moiety and (b) a diol; and R is said diol or a derivative thereof.

14. The coated transport member of claim 13, wherein the diol is at least one member selected from the group consisting of: 1,3-propanediol; 1,6-hexanediol; diethylene glycol; 1,3-benezenedimethanol; bisphenol A; bisphenol Z; bisphenol S; 4,4'-dihydroxy-diphenol-2,2'-butane; 4,4'-dihydroxy-diphenylether; catechol; resorcinol; and hydroquinone.

15. The coated transport member of claim 1, wherein the thiophene-containing polymer is a thiophene-containing vinyl polymer, including a copolymer or a tercopolymer, represented by formula VI:

(VI)

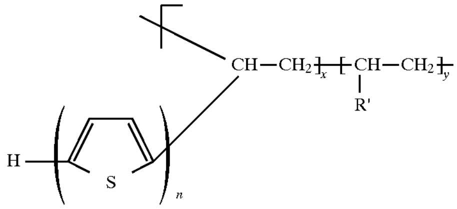

wherein n=1–6; and R' is an alkyl or aromatic group comprising at least one member selected from the group consisting of n-hexyl, n-octyl, phenyl, biphenyl, naphthanyl, methyl methacrylate, acrylate, and acetate, and the ratio of x/y is about 10/90–100/0.

16. The coated transport member of claim 1, wherein the dopant comprises an organic salt represented by formula VII:

(VII)

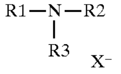

wherein R1 and R2 are each an aromatic group;

R3 is an aromatic or aliphatic group having 2–18 carbons; and

X− is selected from the group consisting of $BF_4$, $PF_6$, $AsF_6$, $SbF_6$, $SbCl_6$, $ClO_4$, trifluoroacetate, toluenesulfonate, trifluorosulfonate, tetraphenylborate, tetrakis(4-fluorophenyl)borate, and tetrakis(4-trifluoromethylphenyl)borate.

17. The coated transport member of claim 1, wherein the dopant comprises an organic salt represented by formula VIII:

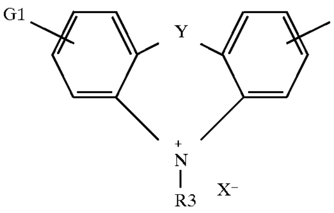

(VIII)

wherein R3 is an aromatic or aliphatic group having 2–18 carbons;

Y is at least one member selected from the group consisting of a single bond, O, S, $CH_2$, $C(CH_3)_2$, C(phenyl)$_2$, $CH_2$, CH═CH, $OCH_2$—$CH_2O$, and C═O;

G1 and G2 each comprises at least one member selected from the group consisting of an alkyl, a halogen, a cyano, an acetyl, a methoxy, and an ethyl ester; and $X^-$ is selected from the group consisting of $BF_4$, $PF_6$, $AsF_6$, $SbF_6$, $SbCl_6$, $ClO_4$, trifluoroacetate, toluenesulfonate, trifluorosulfonate, tetraphenylborate, tetrakis(4-fluorophenyl)borate, and tetrakis(4-trifluoromethylphenyl)borate.

18. The coated transport member of claim 1, wherein the dopant comprises a salt comprising at least one cation selected from the group consisting of: tris(4-bromophenyl) amine; tris(4-chlorophenyl)amine; tris(4-fluorophenyl) amine; tris(p-tolyl)amine; bis(4-methylphenyl)-(4"-chlorophenyl)amine; and bis(4-chlorophenyl)-(4"-methylphenyl)amine;

and at least one anion selected from the group consisting of $BF_4$, $PF_6$, $AsF_6$, $SbF_6$, $SbCl_6$, $ClO_4$, trifluoroacetate, toluenesulfonate, trifluorosulfonate, tetraphenylborate, tetrakis(4-fluorophenyl)borate, and tetrakis(4-trifluoromethylphenyl)borate.

19. The coated transport member of claim 1, wherein the charge-transporting material comprises poly(3-hexylthiophene), and the dopant comprises a salt of tri-p-tolylaminium and $SbCl_6$—.

20. The coated transport member of claim 2, wherein the elastomeric polymer is a butadiene-based copolymer, the charge-transport molecule comprises N,N'-diphenyl-N,N'-di-(3-methyl-phenyl)-[1,1'-biphenyl-4,4'-diamine] or N,N'-di-(4-methlylphenyl)-N,N'-di-(4-ethlylphenyl)-[1,1'-biphenyl-3,3'-dimethyl-4,4'-diamine], and the dopant comprises a salt comprised of tri-p-tolylaminium and $SbCl_6$—.

21. The coated transport member of claim 2, wherein the elastomeric polymer comprises an isoprene-based copolymer, the charge-transport molecule comprises N,N'-diphenyl-N,N'-di-(3-methyl-phenyl)-[1,1'-biphenyl-4,4'-diamine] or N,N'-di-(4-methlylphenyl)-N,N'-di-(4-ethylphenyl)-[1,1'-biphenyl-3,3'-dimethyl-4,4'-diamine] and the dopant comprises a salt comprised of tri-p-tolylaminium and $SbCl_6$—.

22. The coated transport member of claim 2, wherein the elastomeric polymer comprises an aromatic polyether-based polyurethane, the charge-transport molecule comprises 9-ethyl-carbazole-3-carboxaldehyde-1-methyl-1-phenyl hydrazone, and the dopant comprises a salt of tris(p-tolyl) amine and $SbCl_6$—.

23. The coated transport member of claim 1, wherein the dopant comprises about 0.1–50% by weight of the composition.

24. The coated transport member of claim 1, wherein the dopant comprises about 5–27% by weight of the composition.

25. The coated transport member of claim 19, wherein the dopant comprises about 5–27% by weight of the composition.

26. The coated transport member of claim 20, wherein the dopant comprises about 0.6–15% by weight of the charge transport molecule.

27. The coated transport member of claim 21, wherein the dopant comprises about 0.6–15% by weight of the charge-transport molecule.

28. The coated transport member of claim 22, wherein the dopant comprises about 0.1–20% by weight of the charge transport molecule.

29. The coated transport member of claim 1, wherein the core comprises a conductive material or an insulative dielectric material, and the dopant comprises a salt represented by formula VII or formula VIII:

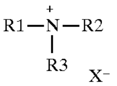

(VII)

wherein R1 and R2 each represent an aromatic group; R3 is an aromatic group selected from the group consisting of 3-methylphenyl; 4-methylphenyl; 4-t-butylphenyl; 2,4-dimethylphenyl; 2,4,6-trimethylphenyl; 3,5-di-t-butylphenyl; 4-chlorophenyl; 2,4-dichlorophenyl; 4-bromophenyl; 4-fluorophenyl; 4-trifluoromethylphenyl; 4-trimethylsilylphenyl; 4-cyanophenyl; 2-methylphenyl; 4-methoxyphenyl; 4-acetylphenyl; 2-methoxy-4-methylphenyl; 4-ethylesterphenyl; and naphthyl or an aliphatic group selected from the group consisting of n-butyl; isopropyl; t-butyl; 1-adamatyl; 2-adamatyl; benzyl; cyclohexyl; and t-octyl; and X– is a member selected from the group consisting of $BF_4$, $PF_6$, $AsF_6$, $SbF_6$, $SbCl_6$, $ClO_4$, trifluoroacetate, toluenesulfonate, trifluorosulfonate, tetraphenylborate, tetrakis(4-fluorophenyl)borate, and tetrakis(4-trifluoromethylphenyl)borate;

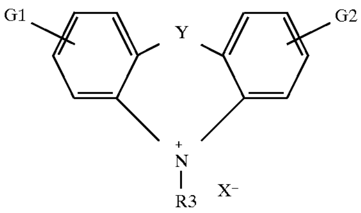

(VIII)

wherein R3 is an aromatic group selected from the group consisting of 3-methylphenyl; 4-methylphenyl; 4-t-butylphenyl; 2,4-dimethylphenyl; 2,4,6-trimethylphenyl; 3,5-di-t-butylphenyl; 4-chlorophenyl; 2,4-dichlorophenyl; 4-bromophenyl; 4-fluorophenyl; 4-trifluoromethylphenyl; 4-trimethylsilylphenyl; 4-cyanophenyl; 2-methylphenyl; 4-methoxyphenyl; 4-acetylphenyl; 2-methoxy-4-methylphenyl; 4-ethylesterphenyl; and naphthyl or an aliphatic group selected from the group consisting of n-butyl; isopropyl; t-butyl; 1-adamatyl; 2-adamatyl; benzyl; cyclohexyl; and t-octyl; Y is at least one member selected from the group consisting of a single bond, O, S, $CH_2$, $C(CH_3)_2$, C(phenyl)$_2$, $CH_2$, CH═CH, $OCH_2CH_2O$, and C═O; G1 and G2 each comprises at least one member selected from the group consisting of an alkyl, a halogen, a cyano, an acetyl, a methoxy, and an ethyl ester; and X− is a member selected from the group consisting of $BF_4$, $PF_6$ $AsF_6$, $SbF_6$, $SbCl_6$, $ClO_4$, trifluoroacetate, toluenesulfonate, trifluorosulfonate, tetraphenylborate, tetrakis(4-fluorophenyl)borate, and tetrakis(4-trifluoromethylphenyl)borate.

* * * * *